(12) United States Patent
Fujikawa et al.

(10) Patent No.: US 7,426,087 B2
(45) Date of Patent: Sep. 16, 2008

(54) INFORMATION RECORDING APPARATUS

(75) Inventors: Akio Fujikawa, Kyoto (JP); Ryousuke Kumagai, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 310 days.

(21) Appl. No.: 11/335,480

(22) Filed: Jan. 20, 2006

(65) Prior Publication Data

US 2006/0119967 A1    Jun. 8, 2006

Related U.S. Application Data

(62) Division of application No. 10/123,486, filed on Apr. 17, 2002, now Pat. No. 7,019,929.

(30) Foreign Application Priority Data

Apr. 26, 2001    (JP) .............................. 2001-129627

(51) Int. Cl.
G11B 15/04 (2006.01)
G11B 19/04 (2006.01)

(52) U.S. Cl. ........................................ 360/60

(58) Field of Classification Search ...................... None
See application file for complete search history.

(56) References Cited

U.S. PATENT DOCUMENTS

| | | | |
|---|---|---|---|
| 4,658,307 A * | 4/1987 | Tsuyuguchi et al. | .......... 360/69 |
| 4,809,091 A | 2/1989 | Miyazawa et al. | |
| 5,270,880 A | 12/1993 | Ottesem et al. | |
| 5,570,244 A | 10/1996 | Wiselogel | |
| 5,999,353 A | 12/1999 | Hase et al. | |
| 6,754,021 B2 | 6/2004 | Kisaka et al. | |

* cited by examiner

*Primary Examiner*—Joseph Feild
*Assistant Examiner*—Daniell L Negrón
(74) *Attorney, Agent, or Firm*—Morgan, Lewis & Bockius LLP

(57) ABSTRACT

An information recording apparatus has a write canceling circuit that monitors interface signals fed from a host and that, when the interface signals are recognized to be abnormal, inhibits write operation against a recording medium either for a predetermined period or until a predetermined condition is fulfilled. This circuit configuration helps eliminate or reduce the occurrence of erroneous write operation as occurs when the received interface signals are abnormal.

2 Claims, 6 Drawing Sheets

INFORMATION RECORDING APPARATUS

This Application is a Divisional of U.S. patent application Ser. No. 10/123,486, filed Apr. 17, 2002 now U.S. Pat. No. 7,019,929 and claims the benefit of Japanese Application No. 2001-129627, filed Apr. 26, 2001, both of which are hereby incorporated by reference in their entirety.

BACKGROUND OF THE INVENTION

1. Field of the Invention

The present invention relates to an information recording apparatus as represented by a floppy disk drive apparatus and the like.

2. Description of the Prior Art

Here, as an example of a conventional information recording apparatus, a floppy disk drive apparatus (hereinafter referred to as an "FDD apparatus") will be described. An FDD apparatus is an information recording/reproducing apparatus for writing data to and reading data from a floppy disk (hereinafter referred to as a "disk") having a plurality of concentrically arranged tracks.

The FDD apparatus receives a write gate signal from a host (such as a personal computer) to permit or inhibit write operation against the disk. When write operation is permitted, the write gate signal is made active (for example, turned to L level). However, write operation against the disk is permitted not by the write gate signal being made active alone. In general, the write gate signal is regarded as valid only when the host has selected the FDD apparatus (a drive select signal is active), a spindle motor has started rotating the disk (a motor on signal or ready signal is active), and a write disable switch on the disk is released (a write protect signal is active).

In the conventional FDD apparatus configured as described above, the write gate signal is not regarded as valid until write operation against the disk becomes possible. Thus, it is true that no unnecessary write operation is performed in that period.

However, this control of write operation assumes that the interface signals fed from the host are normal. In other words, if the interface signals are abnormal (for example, all the interface signals are active simultaneously), as because of instantaneous interruption of the supply of power to the FDD apparatus and the host, or because of transient response accompanying the turning on and off of the supply of power resulting from the FDD apparatus using a different power supply line from the floppy disk controller provided in the host, or because of failure of the interface circuit provided in the FDD apparatus, the aforementioned conditions for validating the write gate signal are fulfilled unexpectedly, and therefore there is a risk of erroneous write operation being performed against the disk.

SUMMARY OF THE INVENTION

An object of the present invention is to provide an information recording apparatus that can eliminate or reduce the occurrence of erroneous write operation as occurs when the interface signals fed thereto are abnormal.

To achieve the above object, according to the present invention, an information recording apparatus is provided with: a write control circuit for controlling write operation against a recording medium according to one or more input signals; and a write canceling circuit for monitoring the input signals to permit or inhibit write operation against the recording medium according to the result of the monitoring. Here, when the write canceling circuit recognizes the input signals to be abnormal, it inhibits write operation against the recording medium either for a predetermined period or until a predetermined condition is fulfilled.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
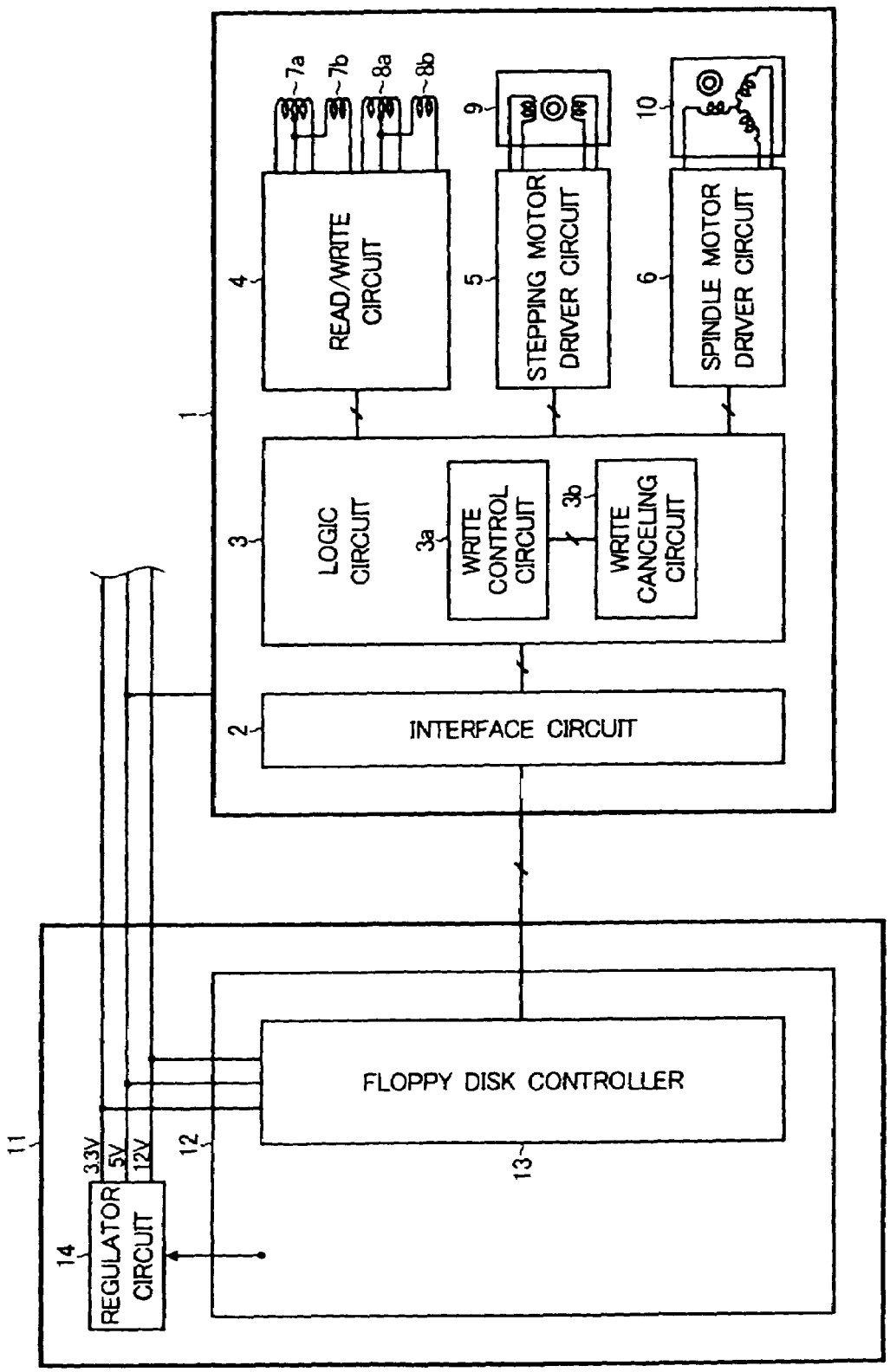
FIG. 1 is a block diagram of an example of the configuration of an FDD apparatus embodying the invention.

As an example of an information recording apparatus embodying the present invention, a floppy disk drive apparatus (hereinafter referred to as an "FDD apparatus") will be described. FIG. 1 is a block diagram showing an example of the configuration of an FDD apparatus embodying the invention. The FDD apparatus 1 is an information recording/reproducing apparatus for writing data to and reading data from an unillustrated floppy disk (hereinafter referred to as a "disk") having a plurality of concentrically arranged tracks. The operation of the FDD apparatus 1 is controlled by various interface signals fed thereto from a floppy disk controller 13 provided on the mother board 12 of a host 11 (such as a personal computer).

In the FDD apparatus 1, a logic circuit 3 exchanges signals with the host 11 through an interface circuit 2, and controls the operation of a read/write circuit 4, a stepping motor driver circuit 5, and a spindle motor driver circuit 6. The logic circuit 3 incorporates a write control circuit 3*a* that controls write operation against the disk according to the interface signals fed from the host 11, and a write canceling circuit 3*b* that monitors the interface signals and that, when the interface signals are detected as being abnormal, inhibits write operation against the disk either for a predetermined period or until a predetermined condition is fulfilled. The write canceling circuit 3*b* will be described in detail later.

The read/write circuit 4 controls the operation of read/write heads 7*a* and 8*a* and delete heads 7*b* and 8*b*. The heads 7*a* and 7*b* are provided on the obverse side of the disk, and the heads 8*a* and 8*b* are provided on the reverse side of the disk. The stepping motor driver circuit 5 controls the operation of a stepping motor 9 that moves the heads 7*a*, 7*b*, 8*a*, and 8*b* stepwise in a radial direction. The spindle motor driver circuit 6 controls the operation of a spindle motor 10 that rotates the disk at a constant linear velocity (for example, 300, 360, or 600 rpm).

The FDD apparatus 1 is supplied with a supply voltage (for example 5 V), from which it operates, from a regulator circuit 14 provided in the host 11. The regulator circuit 14 supplies a plurality of supply voltages (for example, 3.3 V, 5 V, and 12V)

to the floppy disk controller 13 as well. Here, if the mother board 12 of the host 11 is of a type that conforms to the ATX specification (proposed by Intel), the voltage supply operation (for example, starting and stopping of the supply of a voltage) of the regulator circuit 14 can be controlled by the mother board 12.

Next, the configuration and operation of the write canceling circuit 3*b*, which is the portion that characterizes the present invention, will be described, taking up three embodiments as examples.

Figure 2:
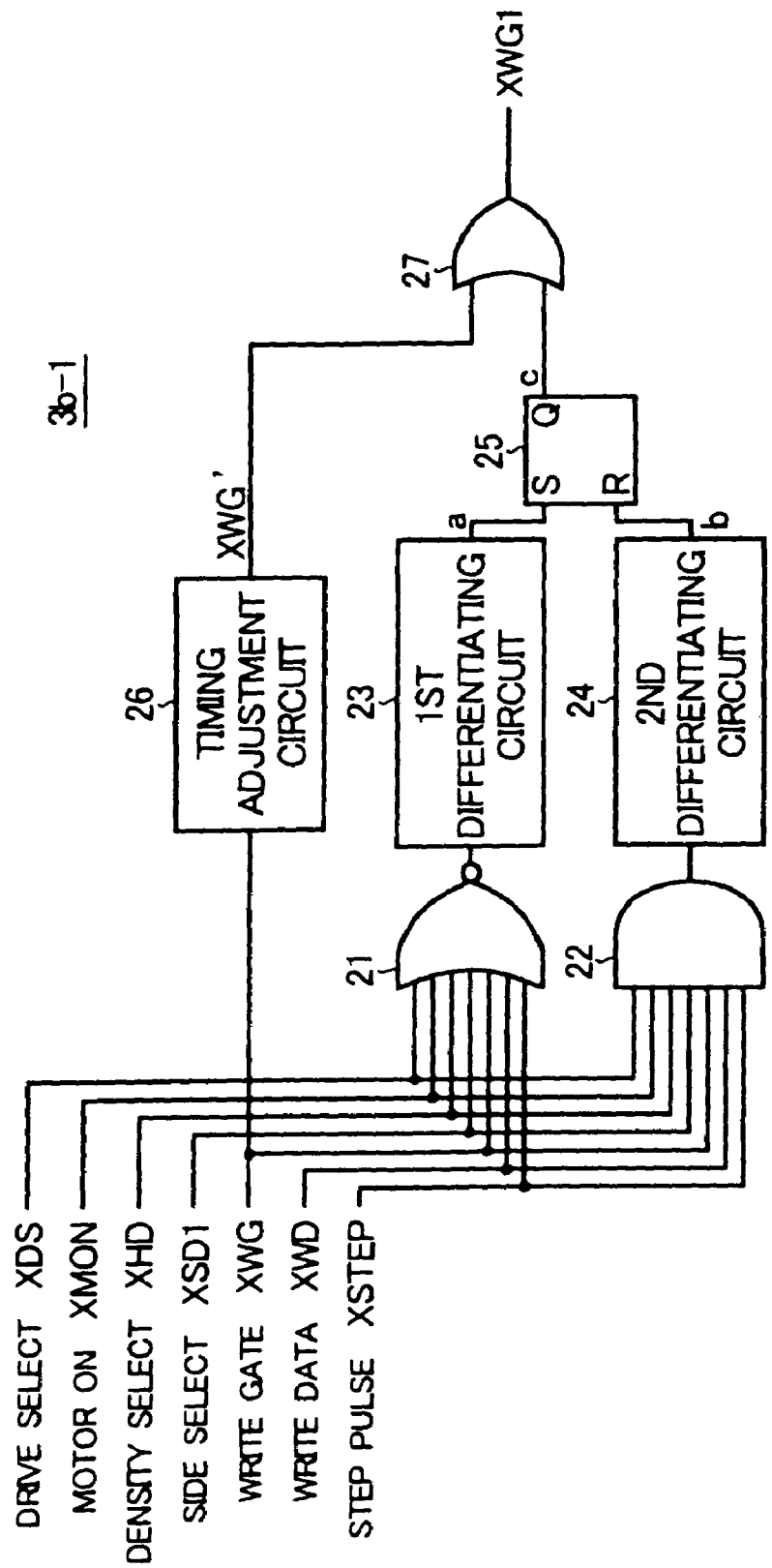
FIG. 2 is a circuit diagram of the write canceling circuit 3*b* of a first embodiment of the invention.
Figure 3:
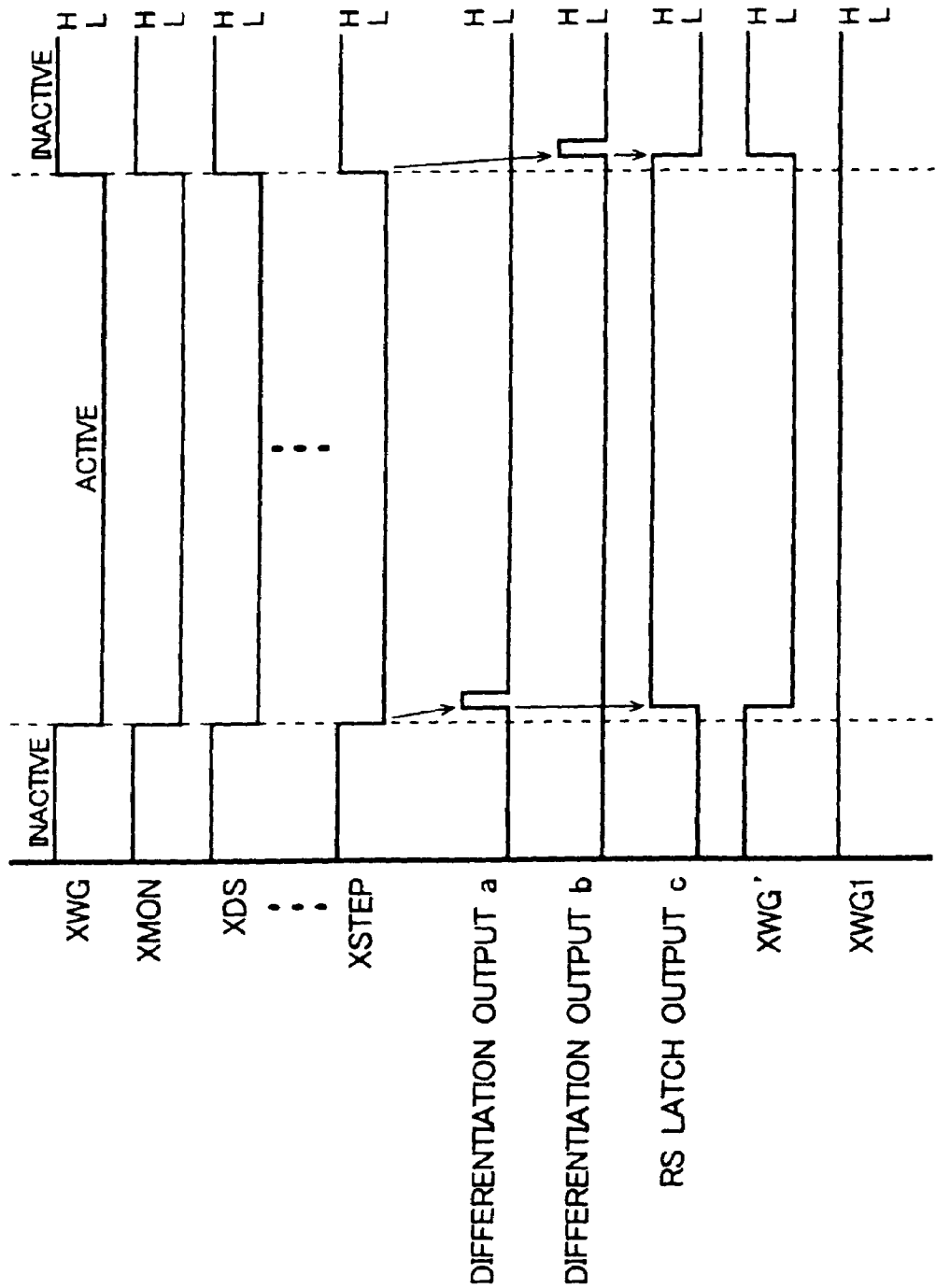
FIG. 3 is a timing chart showing the signal waveforms observed at relevant points in the circuit shown in FIG. 2.

First, the write canceling circuit 3*b* of a first embodiment of the invention will be described with reference to FIGS. 2 and 3. FIG. 2 is a circuit diagram of the write canceling circuit 3*b* of the first embodiment, and FIG. 3 is a timing chart showing the signal waveforms observed at relevant points in the circuit shown in FIG. 2.

The write canceling circuit 3*b*-1 of this embodiment recognizes the interface signals fed from the host 11 to be abnormal when, among those interface signals, a plurality of interface signals that have been appointed as targets of monitoring are detected as being all active (i.e. at L level). The write canceling circuit 3*b*-1 then inhibits write operation against the disk until all the interface signals become inactive next time.

This embodiment deals with an example in which seven interface signals that are likely to be connected to a power supply line different from that to which the FDD apparatus 1 is connected (specifically, drive select signal XDS, motor on signal XMON, density select signal XHD, side select signal XSD1, write gate signal XWG, write data XWD, and step pulse signal XSTEP) are appointed as targets to be monitored. It is to be understood, however, that the combination of interface signals monitored is not limited to this specific combination, but may be varied as the case may be by selecting a plurality of interface signals that are supposed not to be active simultaneously in normal operation according to the specifications of the FDD apparatus 1 and the host 11.

The seven interface signals monitored in the write canceling circuit 3*b*-1 of this embodiment will be described briefly. The drive select signal XDS becomes active when the host 11 selects the FDD apparatus 1. The motor on signal XMON becomes active when the spindle motor 10 is driven. The density select signal XHD becomes active when the disk is of an HD (high-density) type. The write gate signal XWG becomes active when write operation against the disk is permitted. The write data XWD is a signal representing the information to be written to the disk. The step pulse signal XSTEP is a pulse signal that controls the stepwise movement of the heads 7*a*, 8*a*, and 7*b*, and 8*b*.

The seven interface signals described above are all fed to each of a NOR circuit 21 and an AND circuit 22, both having multiple input terminals. The write gate signal XWG is fed to a timing adjustment circuit 26 as well.

The output terminal of the NOR circuit 21 is connected to the input terminal of a first differentiating circuit 23, and the output terminal of the AND circuit 22 is connected to the input terminal of a second differentiating circuit 24. The output terminals of the first and second differentiating circuits 23 and 24 are connected respectively to the set terminal (S) and the reset terminal (R) of an RS flip-flop circuit 25, and the output terminal (Q) of the RS flip-flop circuit 25 is connected to one input terminal of an OR circuit 27. To the other input terminal of the OR circuit 27, the output terminal of the timing adjustment circuit 26 is connected. The output terminal of the OR circuit 27 serves as the output terminal of the write canceling circuit 3*b*-1 as a whole.

In the write canceling circuit 3*b*-1 configured as described above, according to the write gate signal XWG, an internal write gate signal XWG1 is produced and output. Meanwhile, when the plurality of interface signals being monitored all become active (i.e. at L level), the output of the NOR circuit 21 turns from L level to H level. At this point, a pulse rises in the output "a" of the first differentiating circuit 23 according to the change in the output of the NOR circuit 21. As a result, the latch output "c" of the RS flip-flop circuit 25 is set at H level, and the internal write gate signal XWG1 is kept at H level (i.e. inactive) irrespective of the adjusted write gate signal XWG' described later. Thus, no write operation is performed.

Thereafter, when the plurality of interface signals being monitored all become inactive (i.e. back at H level), the output of the AND circuit 22 turns from L level to H level. At this point, a pulse rises in the output "b" of the second differentiating circuit 24 according to the change in the output of the AND circuit 22. As a result, the latch output "c" of the RS flip-flop circuit 25 is reset to L level, and thus the internal write gate signal XWG1 is brought back into its normal mode of operation in which it changes according to the adjusted write gate signal XWG'.

On the other hand, the timing adjustment circuit 26 performs predetermined timing adjustment on the write gate signal XWG fed thereto to produce an adjusted write gate signal XWG'. This embodiment deals with an example in which the write gate signal XWG is subjected to timing adjustment so that the adjusted write gate signal XWG' falls and rises with the same timing as the RS latch output "c" rises and falls, respectively. It is to be understood, however, that the timing adjustment may be performed in any other manner as long as it does not hamper write operation when the interface signals are normal.

In this configuration, the internal write gate signal XWG1 produced by the OR circuit 27 (i.e. a signal representing the OR of the adjusted write gate signal XWG' and the RS latch output "c") is kept at H level all the time after the plurality of interface signals being monitored all become active until all the interface signals become inactive next time.

Thus, by permitting or inhibiting write operation against the disk according to this internal write gate signal XWG1, it is possible, when the plurality of interface signals being monitored are detected as being all active, to recognize the interface signals to be abnormal and inhibit write operation against the disk until all the interface signals become inactive next time. That is, with this configuration, it is possible to eliminate or reduce the occurrence of erroneous writing when the received interface signals are abnormal.

Figure 4:
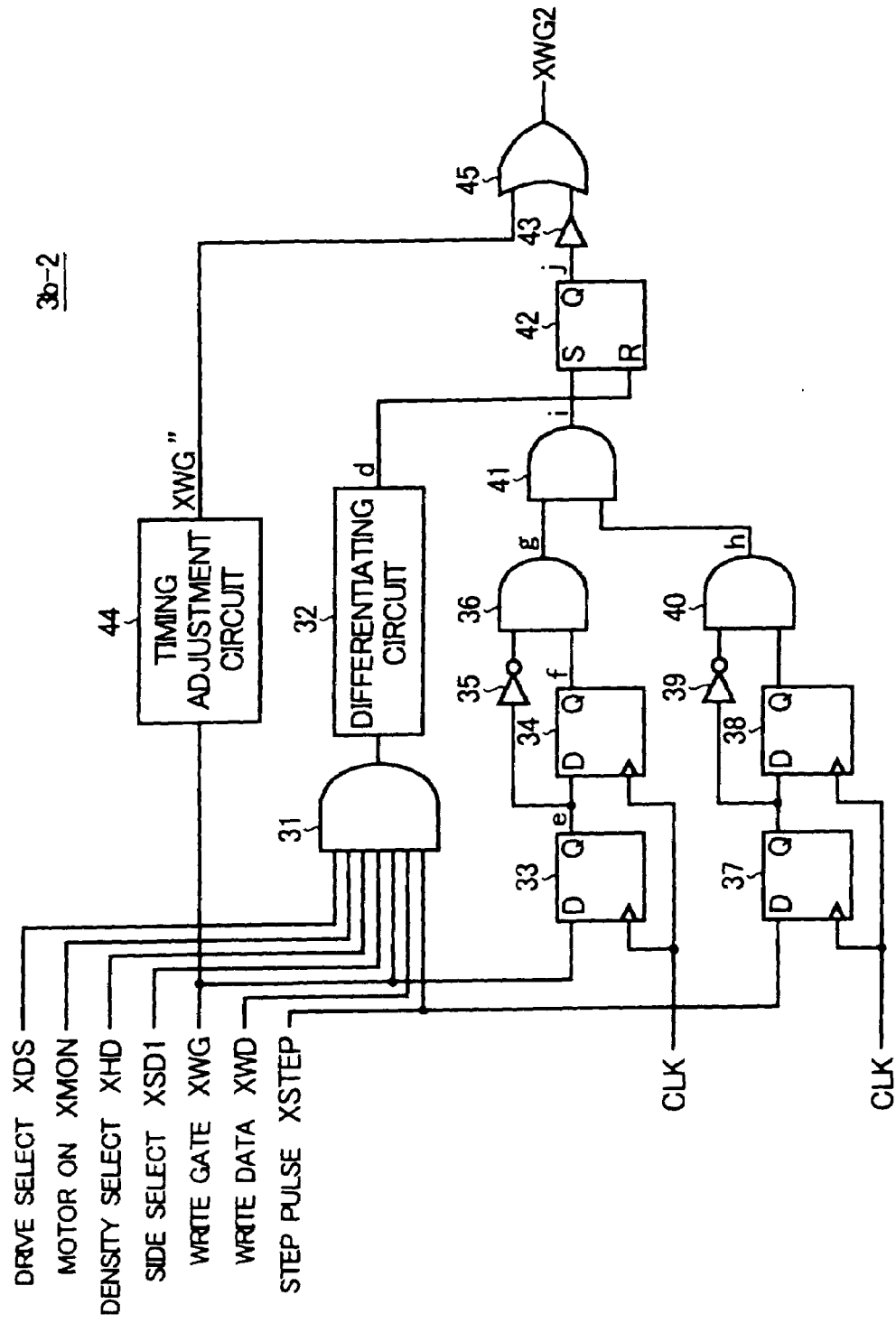
FIG. 4 is a circuit diagram of the write canceling circuit 3*b* of a second embodiment of the invention.
Figure 5:
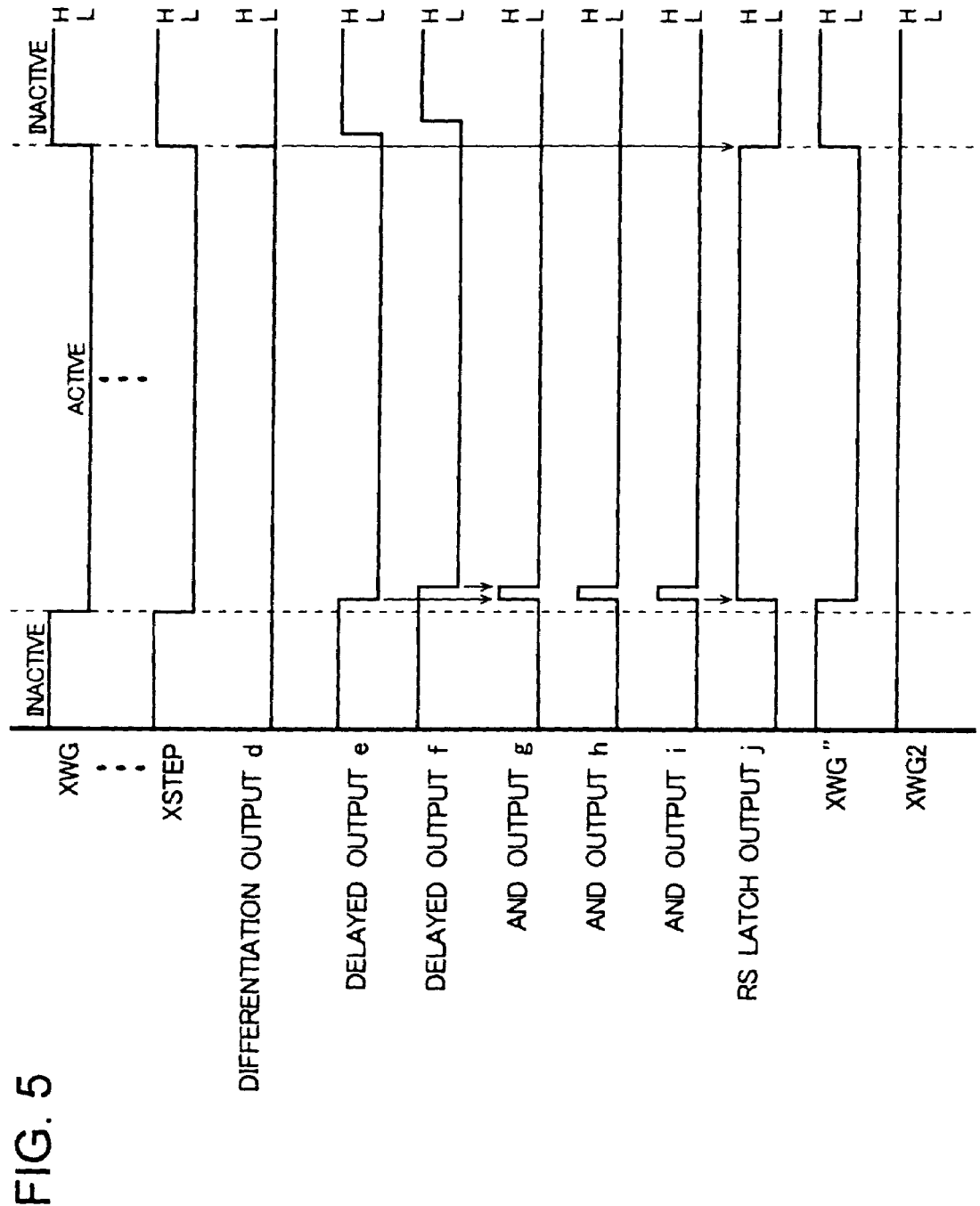
FIG. 5 is a timing chart showing the signal waveforms observed at relevant points in the circuit shown in FIG. 4.

Next, the write canceling circuit 3*b* of a second embodiment of the invention will be described with reference to FIGS. 4 and 5. FIG. 4 is a circuit diagram of the write canceling circuit 3*b* of the second embodiment, and FIG. 5 is a timing chart showing the signal waveforms observed at relevant points in the circuit shown in FIG. 4.

The write canceling circuit 3*b*-2 of this embodiment recognizes the interface signals to be abnormal when, among those interface signals, the write gate signal XWG used to permit or inhibit write operation against the disk and the step pulse signal XSTEP used to control the stepwise movement of the heads are detected as being active simultaneously. The write canceling circuit 3*b*-2 then inhibits write operation against the disk until all the interface signals become inactive next time. This is because, in the FDD apparatus 1, write operation is never performed while the heads are being moved.

This embodiment deals with an example in which seven interface signals that are likely to be connected to a power supply line different from that to which the FDD apparatus 1 is connected (specifically, drive select signal XDS, motor on signal XMON, density select signal XHD, side select signal XSD1, write gate signal XWG, write data XWD, and step pulse signal XSTEP) are appointed as targets to be monitored. It is to be understood, however, that the combination of interface signals monitored is not limited to this specific combination, but may be varied as the case may be by selecting a plurality of interface signals that are supposed not to be active simultaneously in normal operation according to the specifications of the FDD apparatus 1 and the host 11.

The seven interface signals mentioned above are all fed to an AND circuit 31 having multiple input terminals. The write gate signal XWG is fed also to the data terminal (D) of a D flip-flop circuit 33 and to a timing adjustment circuit 44. The step pulse signal XSTEP is fed also to the data terminal (D) of a D flip-flop circuit 37.

The output terminal (Q) of the D flip-flop circuit 33 is connected to the data terminal (D) of a D flip-flop circuit 34, and is connected also through an inverter circuit 35 to one input terminal of an AND circuit 36. The output terminal (Q) of the D flip-flop circuit 34 is connected to the other input terminal of the AND circuit 36. The D flip-flop circuits 33 and 34 receive the same clock pulses CLK at their respective clock terminals.

The output terminal (Q) of the D flip-flop circuit 37 is connected to the data terminal (D) of a D flip-flop circuit 38, and is connected also through an inverter circuit 39 to one input terminal of an AND circuit 40. The output terminal (Q) of the D flip-flop circuit 38 is connected to the other input terminal of the AND circuit 40. The D flip-flop circuits 37 and 38 receive the same clock pulses CLK at their respective clock terminals.

The output terminals of the AND circuits 36 and 40 are connected respectively to the two input terminals of an AND circuit 41. The output terminal of the AND circuit 41 is connected to the set terminal (S) of an RS flip-flop circuit 42.

The output terminal of the AND circuit 31 is connected to the input terminal of a differentiating circuit 32, and the output terminal of the differentiating circuit 32 is connected to the reset terminal (R) of the RS flip-flop circuit 42. The output terminal (Q) of the RS flip-flop circuit 42 is connected through a buffer circuit 43 to one input terminal of an OR circuit 45. To the other input terminal of the OR circuit 45, the output terminal of the timing adjustment circuit 44 is connected. The output terminal of the OR circuit 45 serves as the output terminal of the write canceling circuit 3b-2 as a whole.

In the write canceling circuit 3b-2 configured as described above, the D flip-flop circuit 33 outputs a delayed signal "e" that is delayed one clock pulse CLK relative to the write gate signal XWG fed in, and the D flip-flop circuit 34 outputs a delayed signal "f" that is delayed one more clock pulse CLK relative to the delayed signal "e." Thus, when the write gate signal XWG becomes active (i.e. turns to L level), a pulse rises in the AND output "g" of the AND circuit 36 according to the changes in the outputs of the D flip-flop circuits 33 and 34.

Likewise, the D flip-flop circuit 37 outputs a delayed signal that is delayed one clock pulse CLK relative to the step pulse signal XSTEP fed in, and the D flip-flop circuit 38 outputs a delayed signal that is delayed one more clock pulse CLK relative to that delayed signal. Thus, when the step pulse signal XSTEP becomes active (i.e. turns to L level), a pulse rises in the AND output "h" of the AND circuit 40 according to the changes in the outputs of the D flip-flop circuits 37 and 38.

When these two states arise simultaneously, a pulse rises in the AND output of the AND circuit 41. As a result, the latch output "j" of the RS flip-flop circuit 42 is set at H level, and the internal write gate signal XWG2 is kept at H level (i.e. inactive) irrespective of the adjusted write gate signal XWG" described later. Thus, no write operation is performed.

Thereafter, when the plurality of interface signals being monitored all become inactive (i.e. back at H level), the output of the AND circuit 31 turns from L level to H level. At this point, a pulse rises in the differentiation output "d" of the differentiating circuit 32 according to the change in the output of the AND circuit 31. As a result, the latch output "j" of the RS flip-flop circuit 42 is reset to L level, and thus the internal write gate signal XWG2 is brought back into its normal mode of operation in which it changes according to the adjusted write gate signal XWG." It is to be noted that, in FIG. 5, the delay in the differentiation output "d" is omitted.

On the other hand, the timing adjustment circuit 44 performs predetermined timing adjustment on the write gate signal XWG fed thereto to produce an adjusted write gate signal XWG". This embodiment deals with an example in which the write gate signal XWG is subjected to timing adjustment so that the adjusted write gate signal XWG" falls and rises with the same timing as the output of the buffer circuit 43 rises and falls, respectively. It is to be understood, however, that the timing adjustment may be performed in any other manner as long as it does not hamper write operation when the interface signals are normal.

In this configuration, the internal write gate signal XWG2 produced by the OR circuit 45 (i.e. a signal representing the OR of the adjusted write gate signal XWG" and the output of the buffer circuit 43) is kept at H level all the time after the write gate signal XWG and the step pulse signal XSTEP both become active until all the interface signals become inactive next time.

Thus, by permitting or inhibiting write operation against the disk according to this internal write gate signal XWG2, it is possible, when the write gate signal XWG and the step pulse signal XSTEP are detected as being both active, to recognize the interface signals to be abnormal and inhibit write operation against the disk until all the interface signals become inactive next time. That is, with this configuration, it is possible to eliminate or reduce the occurrence of erroneous writing when the received interface signals are abnormal.

Figure 6:
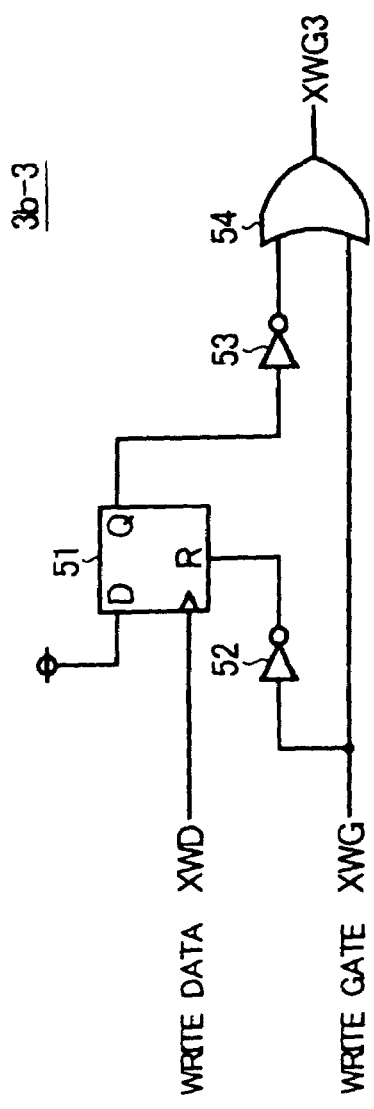
FIG. 6 is a circuit diagram of the write canceling circuit 3*b* of a third embodiment of the invention.
Figure 7:
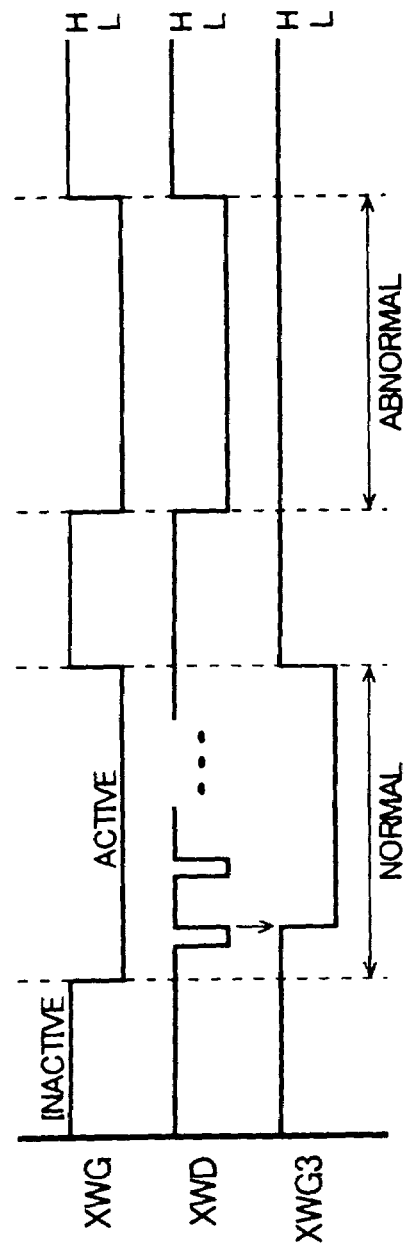
FIG. 7 is a timing chart showing the signal waveforms observed at relevant points in the circuit shown in FIG. 6.

Next, the write canceling circuit 3b of a third embodiment of the invention will be described with reference to FIGS. 6 and 7. FIG. 6 is a circuit diagram of the write canceling circuit 3b of the third embodiment, and FIG. 7 is a timing chart showing the signal waveforms observed at relevant points in the circuit shown in FIG. 6.

The write canceling circuit 3b-3 of this embodiment inhibits write operation against the disk until it detects, among the interface signals fed from the host 11, the first pulse of the write data XWD to be written to the disk. This is because there is no need to permit write operation until the write data XWD is fed in.

The write data XWD mentioned above is fed to the clock terminal of a D flip-flop circuit 51. The write gate signal XWG is fed through an inverter circuit 52 to the reset terminal (R) of the D flip-flop circuit 51, and is fed also to one input terminal of an OR circuit 54. The data terminal (D) of the D flip-flop circuit 51 is connected to a supply voltage line, and the output terminal (Q) thereof is connected through an inverter circuit 53 to the other input terminal of the OR circuit 54. The output terminal of the OR circuit 54 serves as the output terminal of the write canceling circuit 3b-3 as a whole.

In the write canceling circuit 3b-3 configured as described above, when the write gate signal XWG is inactive (i.e. at H level), the output signal of the inverter circuit 52 is at L level. Thus, it is only when the write gate signal XWG becomes active (i.e. turns to L level) that the D flip-flop circuit 51 becomes ready to operate. However, even after the write gate signal XWG becomes active, the internal write gate signal XWG3 produced by the OR circuit 54 (i.e. a signal representing the OR of the write gate signal XWG and the inversion of the output signal of the D flip-flop circuit 51) continues to be inactive (i.e. at H level) until clock pulses are fed in as the write data XWD.

Thereafter, when the first pulse of the write data XWD is fed in, its rising edge triggers the D flip-flop circuit 51 to set its output signal to H level, and thus the internal write gate signal XWG3 becomes active. When the write gate signal XWG becomes inactive, the internal write gate signal XWG3 becomes inactive together.

Thus, by permitting or inhibiting write operation against the disk according to this internal write gate signal XWG3, it is possible to inhibit write operation against the disk until the first pulse of the write data XWD is detected. That is, with this configuration, it is possible to eliminate or reduce the occurrence of erroneous writing when the received interface signals are abnormal.

Where the write canceling circuit 3b-3 of this embodiment is adopted, it is advisable that the first pulse of the write data XWD be used exclusively as a trigger for activating the internal write gate signal XWG3 and not as part of data. This helps increase the accuracy of write operation.

As described above in terms of embodiments, according to the present invention, in an information recording apparatus, even if interface signals are abnormal (for example, all the interface signals are active simultaneously), as because of instantaneous interruption of the supply of power to the information recording apparatus and a host, or because of transient response accompanying the turning on and off of the supply of power resulting from the information recording apparatus using a different power supply line from the host, or because of failure of an interface circuit provided in the information recording apparatus, it is possible to eliminate or reduce the occurrence of erroneous writing against a recording medium.

Where there are constraints on the space that can be secured for a power supply (as in notebook-type and other space-saving personal computers) and the supply of power needs to be managed by individual ICs without adapting the mother board to conform to the ATX specification, abnormal interface signals resulting from the afore-mentioned transient response accompanying the turning on and off of the supply of power are particularly troublesome. However, with an information recording apparatus embodying the invention, even with such abnormal interface signals, it is possible to eliminate or reduce the occurrence of erroneous writing against a recording medium. This adds a certain freedom to the design of power lines, and thus, through miniaturization or omission of components, it is possible to enhance productivity and reduce costs.

The embodiments described above all deal with floppy disk drive apparatus as information recording apparatus embodying the invention. It is to be understood, however, that the present invention find wide application not only in particular types of information recording apparatus as those described above but in information recording apparatus in general.

In the embodiments described above, for easy understanding, the configuration of the write canceling circuit is explained separately in three embodiments. It is to be noted, however, that the circuits of these embodiments may be combined in any manner to prevent erroneous writing more securely.

What is claimed is:
1. An information recording apparatus comprising:
a plurality of interface signals fed from an external host;
a write control circuit for controlling write operation against a recording medium according to the plurality of interface signals; and
a write canceling circuit for monitoring a plurality of predetermined signals among the plurality of interface signals as input signals to permit or inhibit write operation against the recording medium according to a result of the monitoring,
wherein, when the write canceling circuit recognizes at least predetermined input signals among the input signals to be active simultaneously, the write canceling circuit inhibits write operation against the recording medium and thereafter, when the write canceling circuit recognizes all of the input signals to be inactive simultaneously, the write canceling circuit permits write operation against the recording medium,
wherein the predetermined input signals are a write gate signal used to permit or inhibit write operation against the recording medium and a step pulse signal used to move stepwise a head serving as writing means against the recording medium, and
wherein the write canceling circuit comprises:
a first AND circuit that outputs a signal represent an AND of, among the input signals, a plurality of signals that are likely to be connected to different power supply line;
a differentiating circuit for differentiating an output signal of the first AND circuit;
a first delay circuit for giving a predetermined delay to the write gate signal;
a second delay circuit for giving a predetermined delay to an output signal of the first delay circuit;
a third delay circuit for giving a predetermined delay to the step pulse signal;
a fourth delay circuit for giving a predetermined delay to an output signal of the third delay circuit;
a second AND circuit that output a signal representing an AND of an inverted signal of the output signal of the first delay circuit and an output signal of the second delay circuit;
a third AND circuit that outputs a signal representing an AND of an inverted signal of the output signal of the third delay circuit and an output signal of the fourth delay circuit;
a fourth AND circuit that outputs a signal representing an AND of output signals of the second and third AND circuits;
an RS flip-flop circuit that receives at a reset terminal thereof an output signal of the fourth AND circuit and that receives at a reset terminal thereof an output signal differentiating circuit;
a timing adjustment circuit for performing predetermined timing adjustment on the write gate signal; and
an OR circuit that outputs a signal representing an OR of an output signal of the RS flip-flop circuit and an output signal of the timing adjustment circuit,
wherein write operation against the recording medium is permitted or inhibited according to an output signal of the OR circuit.
2. An information recording apparatus as claimed in claim 1, wherein the timing adjustment circuit performs the timing adjustment on the write gate signal in such a way that the write gate signal rises and falls with identical timing as the output signal of the RS flip-flop circuit rises and falls.

* * * * *